(12) United States Patent
Zhang

(10) Patent No.: US 11,025,759 B2
(45) Date of Patent: Jun. 1, 2021

(54) ELECTRONIC APPARATUS AND CAMERA ASSEMBLY

(71) Applicant: Guangdong OPPO Mobile Telecommunications Corp., Ltd., Guangdong (CN)

(72) Inventor: Haiping Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/563,385

(22) Filed: Sep. 6, 2019

(65) Prior Publication Data

US 2019/0394316 A1 Dec. 26, 2019

Related U.S. Application Data

(63) Continuation of application No. PCT/CN2018/074495, filed on Jan. 29, 2018.

(30) Foreign Application Priority Data

Mar. 7, 2017 (CN) .......................... 201710132220.3

(51) Int. Cl.
  *H04M 1/02* (2006.01)
  *H04M 1/03* (2006.01)
(52) U.S. Cl.
  CPC ........... *H04M 1/0264* (2013.01); *H04M 1/03* (2013.01)

(58) Field of Classification Search
  CPC .. H04M 1/0264; H04M 1/03; H04M 2250/12; H04M 1/0266; G06F 1/1686
  See application file for complete search history.

(56) References Cited

U.S. PATENT DOCUMENTS

| 10,291,756 | B2 | 5/2019 | Zhang |
| 2005/0128332 | A1 | 6/2005 | Tsuboi |
| 2007/0045550 | A1 | 3/2007 | Nakajo et al. |
| 2007/0248355 | A1 | 10/2007 | Lee |
| 2009/0298549 | A1 | 12/2009 | Lai |
| 2010/0165182 | A1 | 7/2010 | Yuan |

(Continued)

FOREIGN PATENT DOCUMENTS

| CN | 1914900 A | 2/2007 |
| CN | 101652980 A | 2/2010 |

(Continued)

OTHER PUBLICATIONS

Watanabe, Tetsuyuki, JP-08171477-A Translation, Jul. 1996 (Year: 1996).*

(Continued)

*Primary Examiner* — Diane D Mizrahi

(57) ABSTRACT

Electronic apparatuses and a camera assembly are provided. An electronic apparatus comprises a housing, a display screen, a camera assembly, and a sensor assembly. The display screen is installed at the housing. A first through hole is defined at the display screen. The camera assembly is disposed correspondingly to the first through hole. A step portion forms on the camera assembly, and the step portion comprises a surface facing towards the display screen. The sensor assembly is mounted on the surface of the step portion.

20 Claims, 11 Drawing Sheets

(56) References Cited

U.S. PATENT DOCUMENTS

| | | | |
|---|---|---|---|
| 2010/0315570 A1* | 12/2010 | Mathew | G06F 1/1658 |
| | | | 349/58 |
| 2010/0331058 A1 | 12/2010 | Qingshan et al. | |
| 2012/0134518 A1* | 5/2012 | Otani | H04R 1/023 |
| | | | 381/189 |
| 2013/0094126 A1 | 4/2013 | Rappoport et al. | |
| 2013/0194739 A1* | 8/2013 | Nakajima | G06F 1/162 |
| | | | 361/679.09 |
| 2013/0328051 A1* | 12/2013 | Franklin | G06F 1/1643 |
| | | | 257/59 |
| 2014/0071221 A1* | 3/2014 | Dave | H04R 1/02 |
| | | | 348/14.02 |
| 2014/0080416 A1* | 3/2014 | Seo | H04W 4/80 |
| | | | 455/41.2 |
| 2015/0062337 A1 | 3/2015 | Scalisi | |
| 2015/0077655 A1 | 3/2015 | Choe et al. | |
| 2016/0112553 A1* | 4/2016 | Park | H04M 1/035 |
| | | | 455/575.1 |
| 2016/0277555 A1 | 9/2016 | Lee et al. | |
| 2017/0019512 A1 | 1/2017 | Guerdrum et al. | |
| 2017/0134547 A1 | 5/2017 | Zeng et al. | |
| 2017/0245360 A1* | 8/2017 | Jung | H05K 5/04 |
| 2017/0318136 A1* | 11/2017 | Han | H04M 1/026 |
| 2018/0077271 A1* | 3/2018 | Kim | G06F 1/1626 |
| 2018/0166809 A1* | 6/2018 | Brogan | G06F 1/1637 |
| 2018/0247582 A1* | 8/2018 | Park | G02F 1/133526 |
| 2019/0208638 A1* | 7/2019 | Jung | G02B 7/021 |
| 2019/0253539 A1* | 8/2019 | Ma | H04M 1/0262 |

FOREIGN PATENT DOCUMENTS

| | | | |
|---|---|---|---|
| CN | 103841222 A | | 6/2014 |
| CN | 203666511 U | | 6/2014 |
| CN | 204119279 U | | 1/2015 |
| CN | 104539833 A | | 4/2015 |
| CN | 104601763 A | | 5/2015 |
| CN | 204334759 U | | 5/2015 |
| CN | 104793695 A | | 7/2015 |
| CN | 104950419 A | | 9/2015 |
| CN | 105791651 A | | 7/2016 |
| CN | 205453887 U | | 8/2016 |
| CN | 205610701 U | | 9/2016 |
| CN | 105991807 A | | 10/2016 |
| CN | 205647713 U | | 10/2016 |
| CN | 205726042 U | | 11/2016 |
| CN | 106331235 A | | 1/2017 |
| CN | 106371187 A | | 2/2017 |
| CN | 106453722 A | | 2/2017 |
| CN | 106453722 A | * | 2/2017 |
| CN | 106453724 A | | 2/2017 |
| CN | 106453725 A | | 2/2017 |
| CN | 106453726 A | | 2/2017 |
| CN | 106657485 A | | 5/2017 |
| CN | 106936954 A | | 7/2017 |
| JP | 08171477 A | * | 7/1996 |
| JP | 2007514368 A | | 5/2007 |
| JP | 2013239788 A | | 11/2013 |
| JP | 2014183396 A | | 9/2014 |
| KR | 20090125547 A | | 12/2009 |
| KR | 20110132901 A | | 12/2011 |

OTHER PUBLICATIONS

Ren Yong, CN-106453722-A Translation, Feb. 2017 (Year: 2017).*
Notification to Grant Patent Right for CN Application 201710132220. 3, dated Mar. 13, 2020 (7 pages).
Australian Examination Report and Written Opinion for related Australian application No. 2018229784, dated Apr. 9, 2020 (4 pages).
English translation of Chinese First Office Action and Written Opinion for related Chinese application No. 201710132219.0, dated Feb. 12, 2019 (16 pages).
English translation of Chinese Second Office Action and Written Opinion for related Chinese application No. 201710132219.0, dated Jun. 24, 2019 (16 pages).
European Search Report and Written Opinion for related European application No. 18150952.2, dated Jun. 12, 2018 (21 pages).
European examination report and Written Opinion for related European application No. 18150952.2, dated Nov. 15, 2018 (6 pages).
Singapore's Search Report and Written Opinion for related Singapore's application No. 11201906191T, dated Mar. 9, 2020 (8 pages).
English translation of Taiwan's First Office Action and Written Opinion for related Taiwan's application No. 106144061, dated Nov. 27, 2018 (12 pages).
International Search Report and Written Opinion for related International application No. PCT/CN2018/071962, dated Mar. 19, 2018 (9 pages).
English translation of Notification to Grant Patent Right for Invention ,Chinese application No. 201710132219.0, dated Feb. 26, 2020 (6 pages.
English translation of Notice of Reasons for Refusal ,Japanese application No. 2019534886, dated Jun. 16, 2020 (8 pages).
English translation of Chinese Third Office Action and Written Opinion for related Chinese application No. 201710132219.0, dated Jun. 24, 2019 (16 pages).
Extended European search report issued in corresponding European application No. 18763659.2, dated Oct. 25, 2019 (7 pages).
Third Office Action from China patent office in a counterpart Chinese patent Application 201710132220.3, dated Sep. 20, 2019 (11 pages).
International search report, PCT/CN2018/074495, dated Apr. 19, 2018 (3 pages).
English Translation of First Office Action from China patent office in a counterpart Chinese patent Application No. 201710132220.3, dated Nov. 19, 2018 (7 pages).
English Translation of Second Office Action from China patent office in a counterpart Chinese patent Application No. 201710132220. 3, dated May 10, 2019 (10 pages).
Indian Examination Report , Indian application No. 201834001094, dated Oct. 22, 2020 (5 pages).
Chinese First Office Action with English Translation for Chinese application No. 202010266205.X, dated Dec. 2, 2020 (17 pages).
Singapore's Notice of Eligibility for Grant,Singapore's application No. 11201906191T, dated Dec. 28, 2020 (4 pages).
Indian First Examination Report for Indian application No. 201917039864, dated Jan. 19, 2021 (6 pages).

* cited by examiner

ELECTRONIC APPARATUS AND CAMERA ASSEMBLY

CROSS-REFERENCE TO RELATED APPLICATION(S)

This application is a continuation application of International Patent Application No. PCT/CN2018/074495, filed on Jan. 29, 2018, which claims foreign priority to Chinese Patent Application No. 201710132220.3, filed on Mar. 7, 2017, the contents of both of which are herein incorporated by reference in their entireties.

TECHNICAL FIELD

The present disclosure relates to the field of communication technologies, and in particular, to an electronic apparatus and a camera assembly.

BACKGROUND

In a conventional electronic apparatus (for example, a smart phone), at least one sensor (such as a proximity sensor, a receiver, or the like) is installed inside the electronic apparatus, and a hole is defined at a top of a screen corresponding to the sensor. The sensor may collect external information or transmit information to an outer side of the electronic apparatus via the hole.

However, in this design, the hole defined on the screen is large. Defining the hole on the screen needs to occupy a wider width of the screen of the electronic apparatus, thereby resulting in a lower screen ratio of a display area to the screen.

SUMMARY

In one aspect, an electronic apparatus is provided. The electronic apparatus includes a housing, a display screen, a camera assembly, and a sensor assembly.
The display screen is mounted on the housing and defines a first through hole. The camera assembly disposed correspondingly to the first through hole. A step portion forms on the camera assembly, and the step portion comprises a surface facing towards the display screen. The sensor assembly is mounted on the surface of the step portion.

In another aspect, an electronic apparatus is further provided. The electronic apparatus includes a housing, a display screen, a camera assembly, and a sensor assembly. The display screen is mounted on the housing and defines a first through hole. The camera assembly is disposed correspondingly to the first through hole. The camera assembly includes a base and a lens. The base has a mounting surface facing towards the display screen. The lens is disposed on the mounting surface. The sensor assembly is disposed on the mounting surface.

In a further aspect, a camera assembly for an electronic apparatus is further provided. The electronic apparatus comprises a display screen and a sensor assembly. The camera assembly includes a base and a lens. The base has a mounting surface facing towards the display screen and configured to arrange the sensor assembly thereon. The lens is disposed on the mounting surface of the base and spaces apart from the sensor assembly.

BRIEF DESCRIPTION OF DRAWINGS

In order to describe the technical solutions in the embodiments of the present disclosure more clearly, the following briefly introduces the accompanying drawings required for describing the embodiments. Apparently, the accompanying drawings in the following description are merely some embodiments of the present disclosure, those skilled in the art may acquire other drawings based on these drawings without creative efforts.

DETAILED DESCRIPTION

Figure 1:
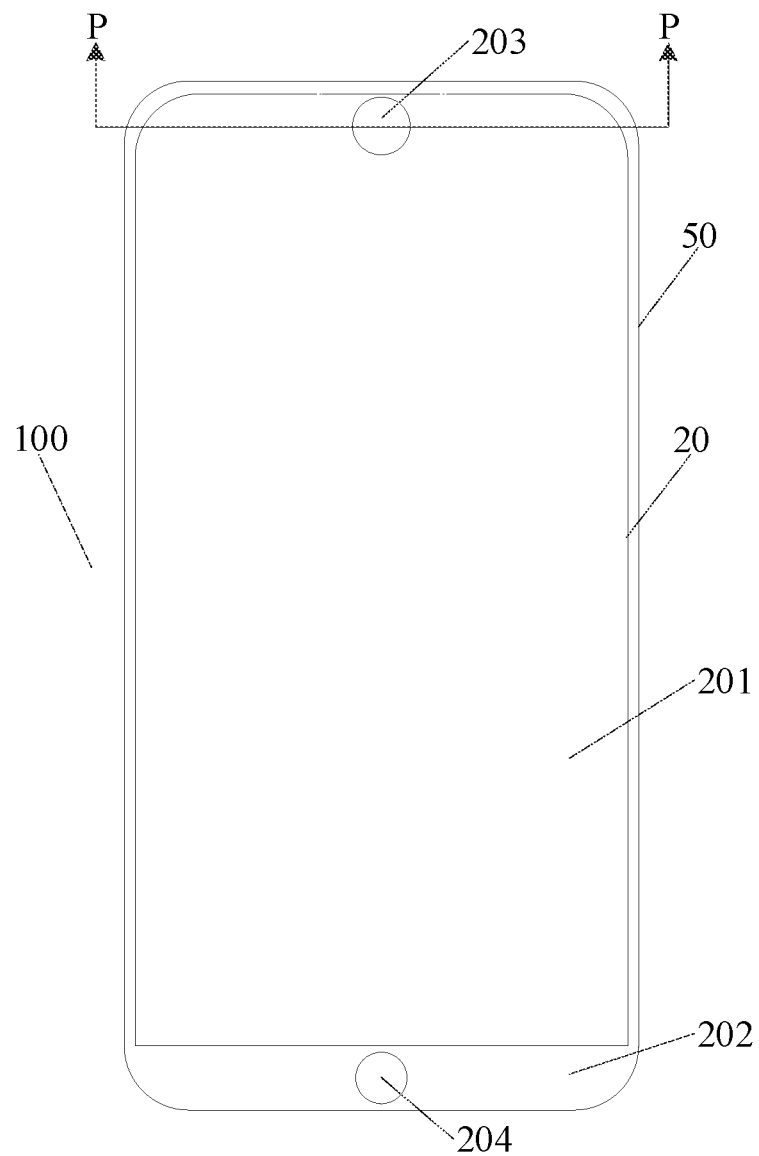
FIG. 1 is a first schematic view of an electronic apparatus according to some embodiments of the present disclosure.

The technical solutions in the embodiments of the present disclosure will be clearly and completely described in detail below with the reference to the accompanying drawings in the embodiments of the present disclosure. Apparently, the embodiments described herein are only some example embodiments, not all the embodiments. Based on the embodiments described in the present disclosure, those skilled in the art may acquire all other embodiments without any creative efforts. All these shall be covered within the protection scope of the present disclosure.

In the description of the embodiments of the present disclosure, it should be understood that, the orientation or positional relationships indicated by the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", or the like, are based on the orientation or positional relationship shown in the drawings and are merely for convenience of description and for simplifying description, rather than implying or indicating that the device or the component must have a particular orientation or constructed and operated in a particular orientation, and thus these terms cannot to be construed as limiting the present disclosure. In addition, terms such as "first", "second", or the like, are used herein for purposes of description and are not intended to indicate or imply relative importance or to imply the number of indicated technical features. Thus, the feature defined with "first", "second", or the like may include one or more of such a feature. In the description of the present disclosure, it should be noted that, "a plurality of" means two or more, unless specified otherwise.

In the present disclosure, it should be noted that, unless specified or limited, otherwise, terms "mounted", "connected", "connected", or the like may be used in a broad sense and may include, for example, fixed connections, detachable connections, or integral connections; may also be mechanical, electrical connections, or communications; may also be direct connections or indirect connections via intervening structures; may also be inner communications of two elements, as can be understood by one skilled in the art depending on specific contexts.

In the present disclosure, a first feature being located "above" or "below" a second feature may include an embodiment in which the first feature is in direct contact with the second feature and an embodiment in which another feature is formed between the first and the second features such that the first feature is not in direct contact with the second feature. Moreover, the first feature being disposed "on", "above", and "upon" the second feature may indicate that the first feature is disposed directly above and obliquely above the second feature, or merely indicate that the first feature is at a higher level than the second feature. The first feature being disposed "below", "under" and "beneath" the second feature may indicate that the first feature is disposed directly below and obliquely below the second feature, or merely indicate that the first feature is at a lower level than the second feature.

The following disclosure provides many different embodiments or examples for implementing different structures of the present disclosure. In order to simplify the present disclosure, components and arrangements of specific examples are described below. Of course, these are merely examples and are not intended to limit the present disclosure. In addition, reference numerals and/or reference letters are repeated in different examples of the present disclosure. The repetition is for the purpose of simplicity and clarity and do not indicate the relationship between various embodiments and/or arrangements discussed herein. Moreover, examples of various specific processes and materials are provided in the present disclosure. However, those skilled in the art may recognize applications of other processes and/or usages of other materials.

In one aspect, an electronic apparatus is provided. The electronic apparatus includes a housing, a display screen, a camera assembly, and a sensor assembly. The display screen is mounted on the housing and defines a first through hole. The camera assembly is disposed correspondingly to the first through hole. A step portion forms on the camera assembly, and the step portion comprises a surface facing towards the display screen. The sensor assembly is mounted on the surface of the step portion.

In some embodiments, the camera assembly comprises a lens, and the sensor assembly comprises a signal transmitter and a signal receiver; the signal transmitter and the signal receiver are disposed at two opposite sides of the lens along a width direction of the electronic apparatus.

In some embodiments, the camera assembly comprises a lens, and the sensor assembly comprises a signal transmitter and a signal receiver; the signal transmitter and the signal receiver are disposed at two opposite sides of the lens along a length direction of the electronic apparatus.

In some embodiments, the signal transmitter is configured to transmit a signal; the signal is reflected by an external object to form a reflection signal, and the signal receiver is configured to receive the reflection signal; the signal comprises at least one of an infrared ray, a laser, and an ultrasonic wave.

In some embodiments, the electronic apparatus is configured to control a display state of the display screen based on an intensity of the reflection signal.

In some embodiments, the sensor assembly comprises an ambient light sensor configured to receive an ambient light signal via the first through hole.

In some embodiments, the electronic apparatus adjusts a brightness of the display screen based on an intensity of the ambient light signal.

In some embodiments, the camera assembly comprises a base and a lens mounted on the base; a size of a contour of the base is greater than that of the lens; the lens and the base cooperatively form or define the step portion.

In some embodiments, the base is in shape of a rectangle or a circle.

In some embodiments, the electronic apparatus may include further a cover and a receiver. The cover covers the display screen and defines a second through hole at a position corresponding to the first through hole. The first through hole communicates with the second through hole. The receiver may be mounted inside the housing and adjacent to the camera assembly. The receiver may be configured to transmit a sound signal to an outer side of the electronic apparatus via the first through hole and the second through hole.

In some embodiments, the electronic apparatus may further include a microphone. The microphone is mounted inside the housing and adjacent to the camera assembly. The microphone is configured to collect an external sound signal via the first through hole and the second through hole.

In some embodiments, the electronic apparatus may further include a cover and a receiver. A slot is defined by at least one side of the display screen and the housing. The cover covers the display screen, and a notch is defined in the cover at a position corresponding to the slot. The notch communicates with the slot. The receiver is mounted inside the housing and adjacent to the slot. The receiver is configured to transmit a sound signal to an outer side of the electronic apparatus via the slot and the notch.

In some embodiments, the electronic apparatus may further include a microphone and adjacent to the slot. The microphone is mounted inside the housing and configured to collect an external sound signal via the slot and the notch.

In some embodiments, the slot is in shape of an elongated rectangle or a rounded rectangle.

In some embodiments, the slot has a width ranged between 0.4 mm and 0.5 mm.

In some embodiments, the electronic apparatus may further include a cover and two receivers. Two slots are defined by the two opposite sides of the display screen and corresponding sides of the housing. The cover covers the display screen, and two notches are defined by two opposite sides of cover at positions corresponding to the slots.

The receivers are mounted inside the housing, and each of the receivers is configured to transmit a sound signal to an outer side of the electronic apparatus via one of the slots and the corresponding notch.

In some embodiments, each of the slots is in shape of a rectangle or a rounded rectangle.

In some embodiments, each of the slots has a width ranged between 0.4 mm and 0.5 mm.

In another aspect, an electronic apparatus is further provided. The electronic apparatus includes a housing, a display screen, a camera assembly, and a sensor assembly. The display screen is mounted on the housing and defines a first through hole. The camera assembly is disposed correspondingly to the first through hole. The camera assembly includes a base and a lens. The base has a mounting surface facing towards the display screen. The lens is disposed on the mounting surface. The sensor assembly is disposed on the mounting surface.

In some embodiments, the lens is located in a middle of the mounting surface. The sensor assembly comprises a signal transmitter and a signal receiver; the signal transmitter and the signal receiver are disposed at two opposite sides of the lens along a width direction or a length direction of the electronic apparatus.

In some embodiments, the sensor assembly comprises an ambient light sensor disposed on the mounting surface and configured to receive an ambient light signal via the first through hole; the ambient light sensor spaces apart from the lens.

In some embodiments, a size of a contour of the base is greater than that of the lens, and the base is in shape of a rectangle or a circle.

In some embodiments, the electronic apparatus further includes a cover, a receiver, and a microphone. The cover covers the display screen and defines a second through hole at a position corresponding to the first through hole. The first through hole communicates with the second through hole. The receiver is mounted inside the housing and adjacent to the camera assembly. The receiver is configured to transmit a sound signal to an outer side of the electronic apparatus via the first through hole and the second through hole. The microphone is mounted inside the housing and adjacent to the camera assembly. The microphone is configured to collect an external sound signal via the first through hole and the second through hole.

In some embodiments, the electronic apparatus further comprises a cover, a receiver, and a microphone. A slot is defined by at least one side of the display screen and the housing. The cover covers the display screen, and a notch is defined in the cover at a position corresponding to the slot; the notch communicates with the slot. The receiver and the microphone are mounted inside the housing and adjacent to the slot. The receiver is configured to transmit a sound signal to an outer side of the electronic apparatus via the slot and the notch. The microphone is configured to collect an external sound signal via the slot and the notch.

In some embodiments, the slot is in shape of an elongated rectangle or a rounded rectangle, and the slot has a width ranged between 0.4 mm and 0.5 mm.

In some embodiments, the electronic apparatus further comprises a cover and two receivers. Two slots are defined by the two opposite sides of the display screen and corresponding sides of the housing. The cover covers the display screen, and two notches are defined by two opposite sides of cover at positions corresponding to the slots. The receivers are mounted inside the housing, and each of the receivers is configured to transmit a sound signal to an outer side of the electronic apparatus via one of the slots and the corresponding notch.

In a further aspect, a camera assembly for an electronic apparatus is further provided. The electronic apparatus comprises a display screen and a sensor assembly. The camera assembly includes a base and a lens. The base has a mounting surface facing towards the display screen and configured to arrange the sensor assembly thereon. The lens is disposed on the mounting surface of the base and spaces apart from the sensor assembly.

In some embodiments, the lens is located in a middle of the mounting surface, and the sensor assembly comprises at least one of a proximity sensor and an ambient light sensor spacing apart from each other; the proximity sensor comprises a signal transmitter and a signal receiver disposed at two opposite sides of the lens along a width direction or a length direction of the electronic apparatus.

Figure 2:
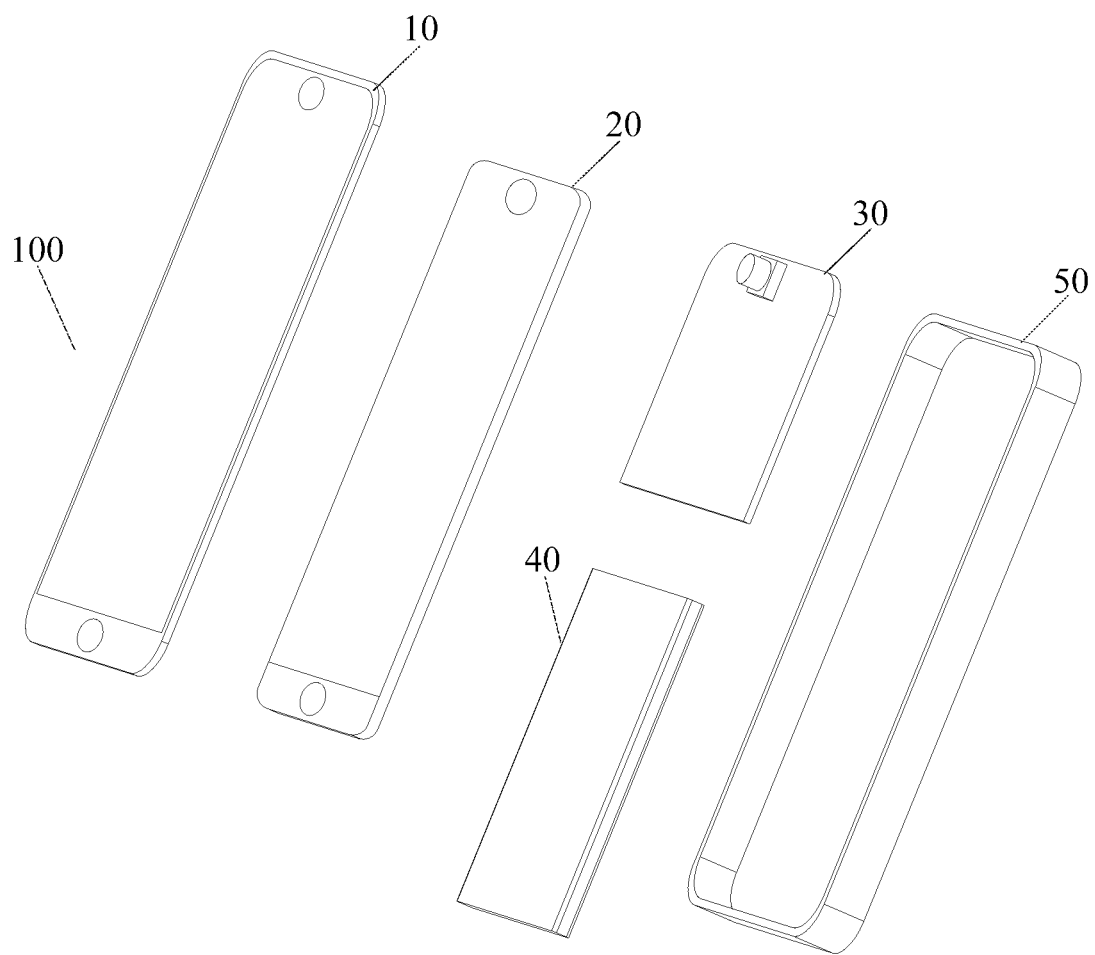
FIG. 2 is an exploded view of the electronic apparatus according to some embodiments of the present disclosure.

As shown in FIGS. 1 and 2, an electronic apparatus 100 may include a cover 10, a display screen 20, a circuit board 30, a battery 40, and a housing 50.

Figure 3:
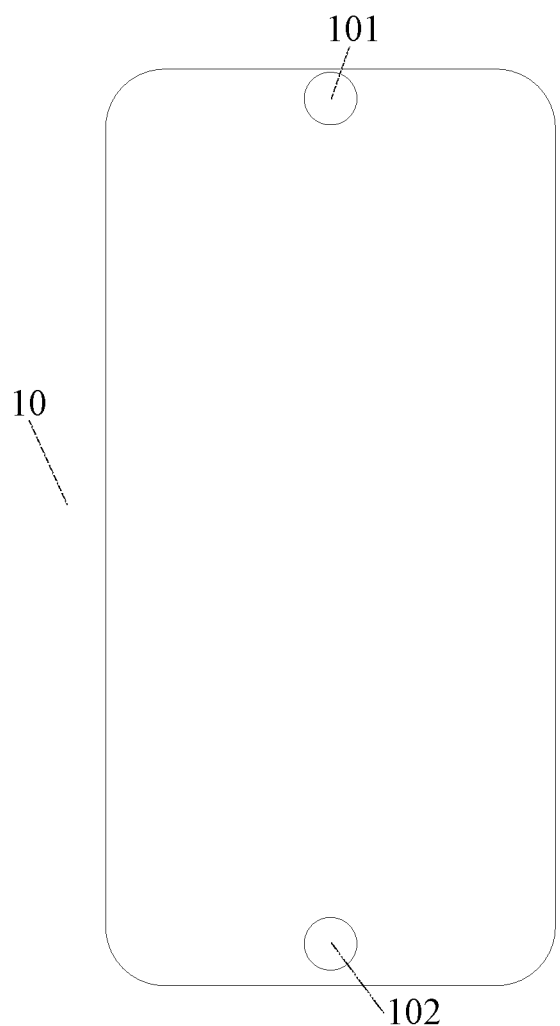
FIG. 3 is a first schematic view of a cover according to some embodiments of the present disclosure.

The cover 10 may be mounted onto the display screen 20, in order to cover the display screen 20. As shown in FIG. 3, the cover 10 may define a through hole 101 and a through hole 102. The through hole 101 and the through hole 102 may be defined at two opposite ends of the cover 10, respectively. The through hole 101 may be configured in such a way that a receiver of the electronic apparatus 100 may transmit a sound signal to an outer side of the electronic apparatus via the through hole 101. At the same time, the through hole 101 may also be configured in such a way that a microphone of the electronic apparatus 100 may collect an external sound signal via the through hole 101. The through hole 102 may be configured in such a way that a fingerprint module of the electronic apparatus 100 may collect fingerprint information of a user via the through hole 102.

In some embodiments, the through hole 101 may be defined in the middle at a top end of the cover 10. The through hole 102 may be defined in the middle at a bottom end of the cover 10.

The cover 10 may be a transparent glass cover. In some embodiments, the cover 10 may be a glass cover made of a material such as sapphire or the like.

Figure 4:
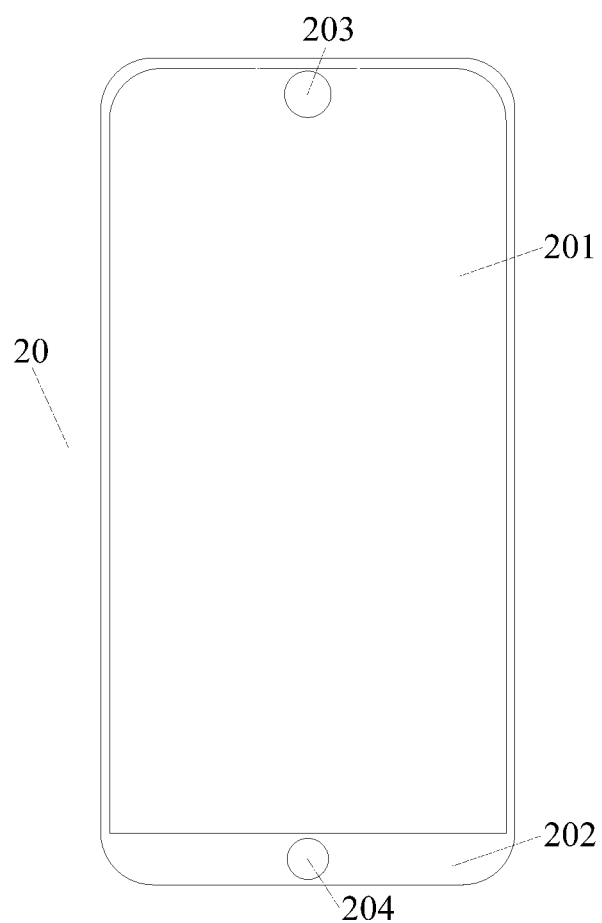
FIG. 4 is a first schematic view of a display screen according to some embodiments of the present disclosure.

The display screen 20 may be mounted on the housing 50 to form a display surface of the electronic apparatus 100. As shown in FIG. 4, the display screen 20 may include a display area 201 and a non-display area 202. The display area 201 may be configured to display information such as images, texts, or the like. The non-display area 202 may not display information. Functional components, such as the fingerprint module, a touch circuit, or the like, may be arranged at a bottom of the non-display area 202.

A through hole 203 may be defined in the display area 201. The through hole 203 may be disposed correspondingly to the through hole 101 defined in the cover 10 and communicate with the through hole 101. The through hole 203 may be configured in such a way that a camera assembly 31 of the electronic apparatus 100 may collect an external image signal via the through hole 203, a proximity sensor of the electronic apparatus 100 may transmit and receive signals via the through hole 203, the receiver of the electronic apparatus 100 may transmit the sound signal to the outer side of the electronic apparatus via the through hole 203, and the microphone of the electronic apparatus 100 may collect the external sound signal via the through hole 203.

A through hole 204 may be defined in the non-display area 202. The through hole 204 may be disposed correspondingly to the through hole 102 defined in the cover 10. The through hole 204 may be configured in such a way that the fingerprint module of the electronic apparatus 100 may collect the fingerprint information of the user via the through hole 204.

In some embodiments, the through hole 203 may be defined in the middle at a top end of the display area 201. The through hole 204 may be defined in the middle at a bottom end of the non-display area 202.

The circuit board 30 may be disposed inside the housing 50. The circuit board 30 may be configured as a main board of the electronic apparatus 100. Functional components, such as the camera assembly 31, the proximity sensor, the receiver, the microphone, or the like, may be integrated on the circuit board 30. Meanwhile, the display screen 20 may be electrically connected to the circuit board 30.

Figure 5:
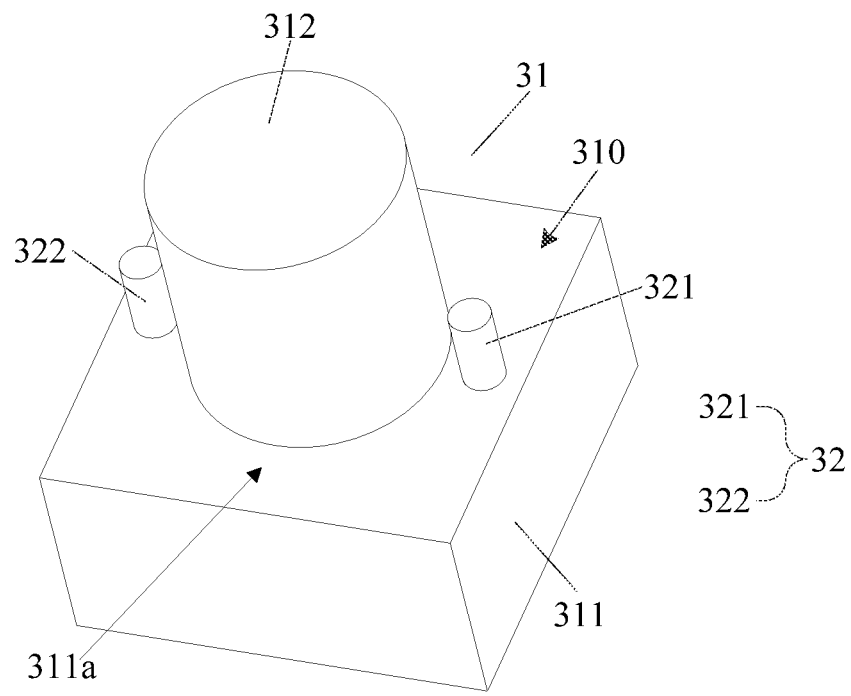
FIG. 5 is a first schematic view of a camera assembly according to some embodiments of the present disclosure.

As shown in FIG. 5, the camera assembly 31 may be integrated on the circuit board 30 and disposed correspondingly to the through hole 203 defined on the display screen 20. In some embodiments, the camera assembly 31 may be partially or completely received in the through hole 203. In some embodiments, the camera assembly 31 may also be disposed at a level lower than the display screen 20, such that no part of the camera assembly 31 is received in the through hole 203.

The camera assembly 31 may include a base 311 and a lens 312. The lens 312 may be mounted on the base 311. More specifically, the base 311 may have a mounting surface 311a facing towards the display screen 20, and the lens 312 may be mounted on the mounting surface 311a of the base 311. In some embodiments, the lens 312 may be disposed in the middle of the mounting surface 311a of the base 311. A contour of the base 311 may be in shape of a rectangle or in other shapes such as a circle or the like. A size of the contour of the base 311 may be greater than that of the lens 312, such that a step portion 310 may form on the camera assembly 31. The step portion 310 may include a surface facing towards the display screen 20 of the electronic apparatus 100. Herein, the surface of the step portion 310 may be the mounting surface 311a previously described.

A sensor assembly 32 may be arranged on the step portion 310 and space apart from the lens 312. The sensor assembly 32 may include a signal transmitter 321 and a signal receiver 322. The signal transmitter 321 and the signal receiver 322 may form the proximity sensor. The signal transmitter 321 and the signal receiver 322 may be electrically connected to the circuit board 30.

The signal transmitter 321 may be configured to transmit a transmission signal. The transmission signal is reflected by an external object to form a reflection signal, and the signal receiver 322 may be configured to receive the reflection signal. The electronic apparatus 100 may determine a distance between the electronic apparatus 100 and the external object based on an intensity of the reflection signal, thereby controlling a display state of the display screen 20.

The transmission signal and the reflection signal may be an optical signal such as an infrared ray, a laser, or the like. The signal may also be the sound signal such as an ultrasonic wave signal or the like. The signal may also be other types of signals.

The signal transmitter 321 and the signal receiver 322 may be disposed at two opposite sides of the lens 312 along a width direction of the electronic apparatus 100. The signal transmitter 321 and the signal receiver 322 may also be disposed at two opposite sides of the lens 312 along a length direction of the electronic apparatus 100.

Since the step portion 310 forms on the camera assembly 31 and the sensor assembly 32 is mounted on the step portion 310, it is unnecessary to define a separate hole in the electronic apparatus 100 for the sensor assembly 32. Therefore, the sensor assembly 32 will not occupy the display area on the screen of the electronic apparatus 100, that is, the screen ratio of the display area of the screen may be increased.

Figure 6:
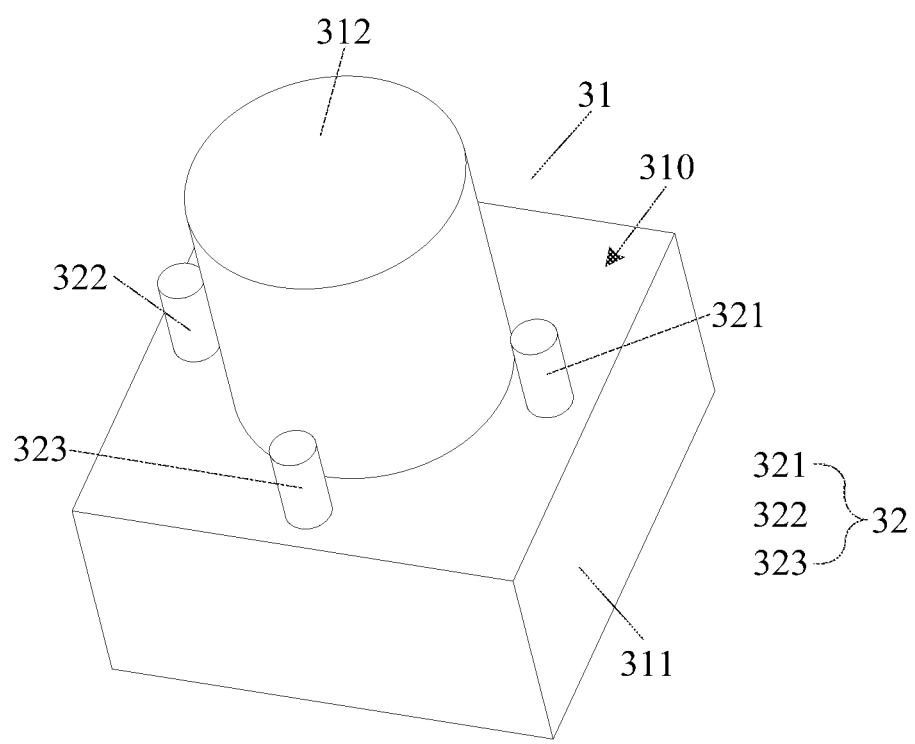
FIG. 6 is a second schematic view of a camera assembly according to some embodiments of the present disclosure.

As shown in FIG. 6, the sensor assembly 32 may also include an ambient light sensor 323. The ambient light sensor 323 may be disposed around the lens 312 and arranged on the step portion 310. The ambient light sensor 323 may also be electrically coupled to circuit board 30 and configured to receive an ambient light signal. The electronic apparatus 100 may adjust the brightness of the display screen 20 based on an intensity of the ambient light signal.

The battery 40 may be disposed inside the housing 50. The battery 40 may be configured to provide power supply to the electronic apparatus 100.

The housing 50 may be configured to form an outer contour of the electronic apparatus 100. The housing 50 may be made of plastic or metal. The housing 50 may integrally form as one component.

Figure 7:
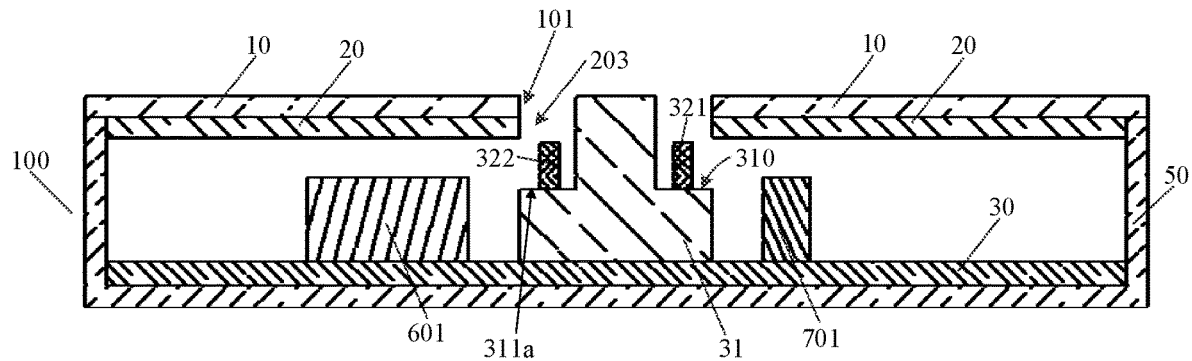
FIG. 7 is a sectional view of the electronic apparatus shown in FIG. 1 and taken along P-P direction.

As shown in FIG. 7, FIG. 7 is a sectional view of the electronic apparatus of FIG. 1 taken along the P-P direction.

The housing 50 may form the outer contour of the electronic apparatus 100.

The circuit board 30 may be disposed inside the housing 50. The camera assembly 31, the receiver 601, and the microphone 701 may be integrated on the circuit board 30. The receiver 601 and the microphone 701 may be disposed adjacent to the camera assembly 31 and around the camera assembly 31. When viewed from the outer side of the electronic apparatus 100, the receiver 601 and the microphone 701 may be hidden and invisible. The step portion 310 may form on the camera assembly 31. The signal transmitter 321 and the signal receiver 322 may be disposed on the step portion 310. The signal transmitter 321 and the signal receiver 322 may be disposed at two opposite sides of the lens of the camera assembly 31 along the width direction of the electronic apparatus 100.

The display screen 20 may be disposed on the housing 50, and the through hole 203 may be defined in the display screen 20.

The cover 10 may be disposed on the display screen 20 to cover the display screen 20. The cover 10 may define the through hole 101. The through hole 101 may be disposed correspondingly to the through hole 203 defined in the display screen 20.

The camera assembly 31 may be configured to collect the external image signal via the through hole 203 and the through hole 101. The signal transmitter 321 may be configured to transmit the signal to the outer side via the through hole 203 and the through hole 101. The signal receiver 322 may be configured to receive the reflection signal reflected by the external object via the through hole 203 and the through hole 101. The receiver 601 may be configured to transmit the sound signal to the outer side via the through hole 203 and the through hole 101. The microphone 701 may be configured to collect the external sound signal via the through hole 203 and the through hole 101.

Figure 8:
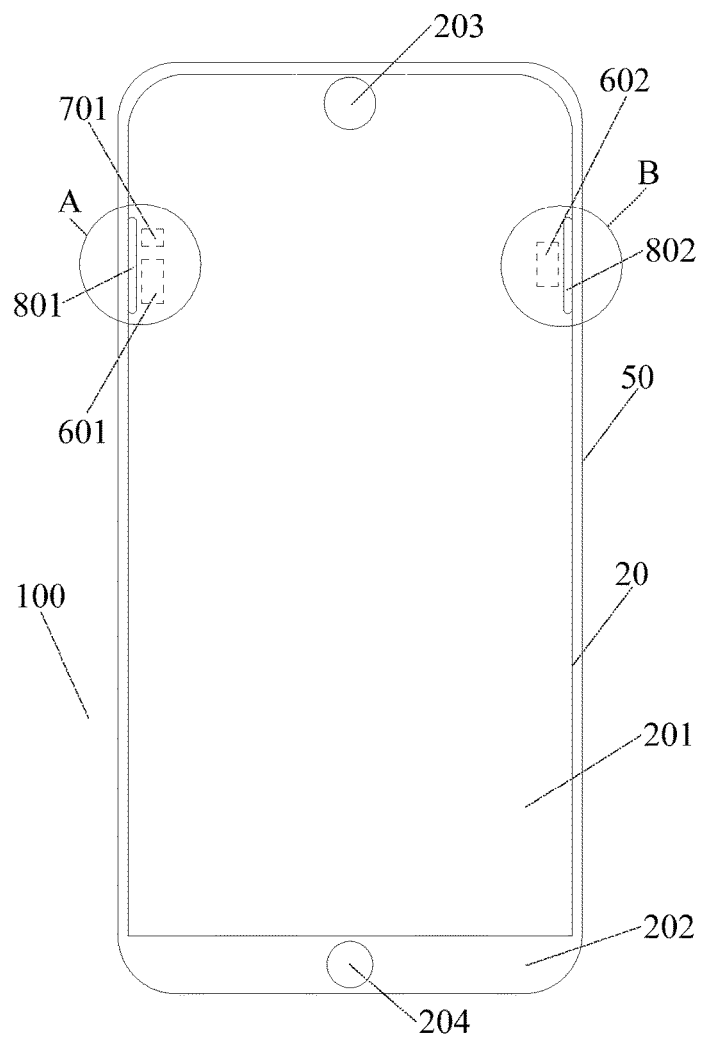
FIG. 8 is a second schematic view of an electronic apparatus according to some embodiments of the present disclosure.

As shown in FIG. 8, FIG. 8 is another schematic structural view of the electronic apparatus 100 according to some embodiments of the present disclosure.

In some embodiments, the display screen 20 may include a display area 201 and a non-display area 202. The display area 201 may be configured to display information such as images, texts, or the like. The non-display area 202 may not display information. Functional components, such as a fingerprint module, a touch circuit, or the like, may be arranged at a bottom of the non-display area 202.

A through hole 203 may be defined in the display area 201. The through hole 203 may be configured in such a way that a camera assembly of the electronic apparatus 100 may collect an external image signal via the through hole 203, and that a proximity sensor of the electronic apparatus 100 may transmit and receive signals via the through hole 203.

A through hole 204 may be defined in the non-display area 202. The through hole 204 may be configured in such a way that the fingerprint module of the electronic apparatus 100 may collect the fingerprint information of the user via the through hole 204.

A slot 801 and a slot 802 may be defined by two opposite sides of the display screen 20 and corresponding inner sides of the housing 50. More specifically, the slot 801 may be defined at one side of the display screen 20 and the corresponding inner side of the housing 50. The slot 802 may be defined at the other side of the display screen 20 and the corresponding inner side of the housing 50. In some embodiments, the slot 801 and the slot 802 may be defined at an upper portion of the electronic apparatus 100. Herein, "upper" refers that the element is close to the top end. Additional slots may be defined in the cover of the electronic apparatus 100 and corresponding to the slot 801 and the slot 802. The electronic apparatus 100 may include two receivers (including the receiver 601 and the receiver 602). The receiver 601 and the receiver 602 may be disposed below the display screen 20 and adjacent to the slot 801 and the slot 802. When viewed from the outer side of the electronic apparatus 100, the receiver 601 and the receiver 602 may be hidden and invisible.

In some embodiments, the receiver 601 may be disposed at a position adjacent to the slot 801 and configured to transmit the sound signal to the outer side via the slot 801. The receiver 602 may be disposed at a position adjacent to the slot 802 and configured to transmit the sound signal to the outer side via the slot 802.

The electronic apparatus 100 may also include the microphone 701. The microphone 701 may be disposed below the display screen 20. When viewed from the outer side of the electronic apparatus 100, the microphone 701 may be hidden and invisible.

In some embodiments, the microphone 701 may be disposed at a position adjacent to the slot 801 and configured to collect the external sound signal via the slot 801.

In some embodiments, the microphone 701 may also be disposed at a position adjacent to the slot 802. In this case, the microphone 701 may be configured to collect the external sound signal via the slot 802.

In some embodiments, the number of the microphones 701 may also be two. The two microphones 701 may be respectively disposed adjacent to the slot 801 and the slot 802 and configured to collect the external sound signals via the slot 801 and the slot 802, respectively.

Figure 9:
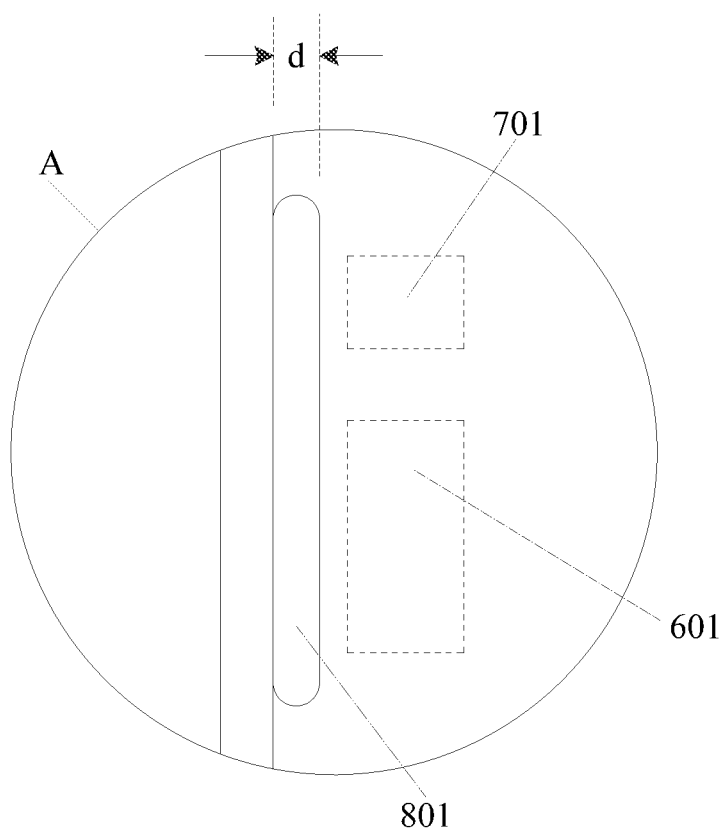
FIG. 9 is a partially enlarged view of a region A of the electronic apparatus shown in FIG. 8.
Figure 10:
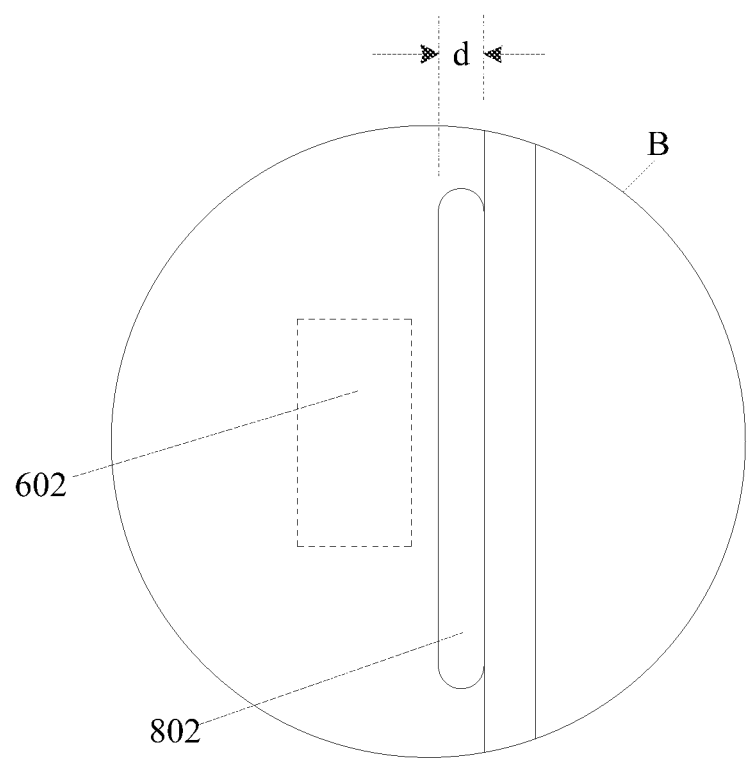
FIG. 10 is a partially enlarged view of a region B of the electronic apparatus shown in FIG. 8.

As shown in FIG. 9 and FIG. 10, FIG. 9 is a partially enlarged view of a region A of the electronic apparatus shown in FIG. 8, and FIG. 10 is a partially enlarged view of a region B of the electronic apparatus shown in FIG. 8.

In some embodiments, the slot 801 and the slot 802 may be in shape of such as an elongated rectangle or a rounded rectangle. Each of the slot 801 and the slot 802 may have a width d ranged between 0.4 mm and 0.5 mm. The slot 801 and the slot 802 having the width ranged between 0.4 mm and 0.5 mm are difficult for the user to perceive. On the other hand, the slot 801 and the slot 802 having the width ranged between 0.4 mm and 0.5 mm may hardly occupy the width of the screen, such that the screen ratio of the display area to the screen may be increased.

Figure 11:
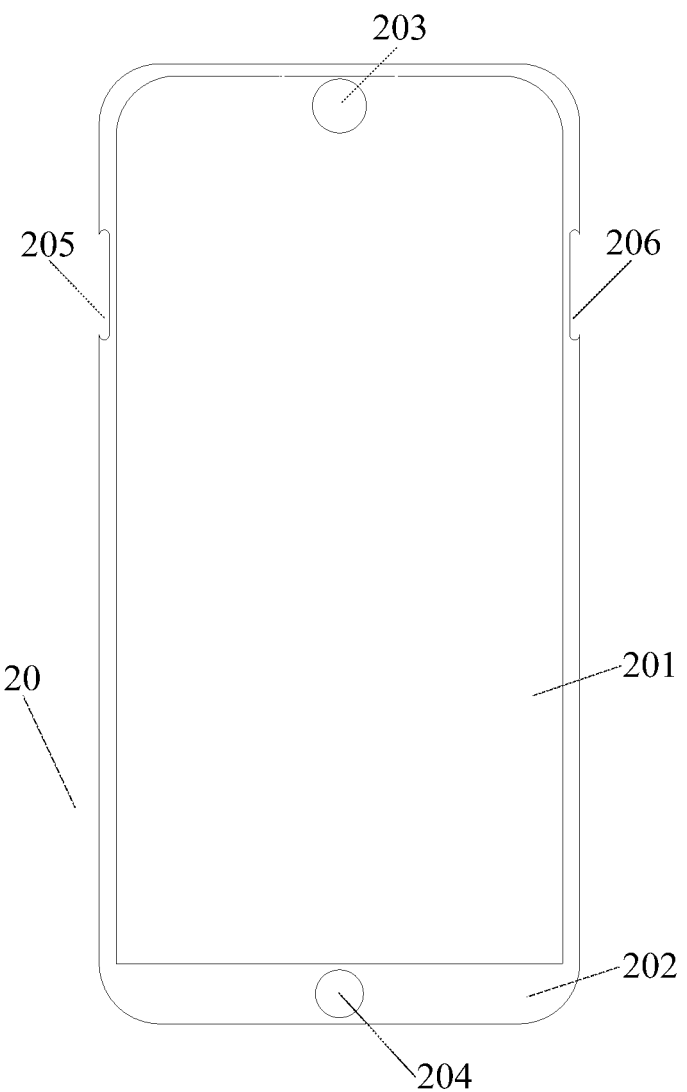
FIG. 11 is a second schematic view of a display screen according to some embodiments of the present disclosure.

As shown in FIG. 11, the slot 801 and the slot 802 may be defined by a notch 205 and a notch 206 defined at two opposite sides of the display screen 20. The notch 205 and the notch 206 may be defined at two opposite sides of the display screen. In some embodiments, two opposite edges of the display screen 20 may be recessed in a direction towards a middle of the display screen 20, such that the notch 205 and the notch 206 may form. After the assembly of the electronic apparatus 100 is finished, the slot 801 and the slot 802 may be defined by two opposite sides of the display screen 20 and the corresponding inner sides of the housing 50.

In some embodiments, the slot 801 and the slot 802 may also be defined by the notch 205 and the notch 206 defined at two inner sides of the housing 50.

Figure 12:
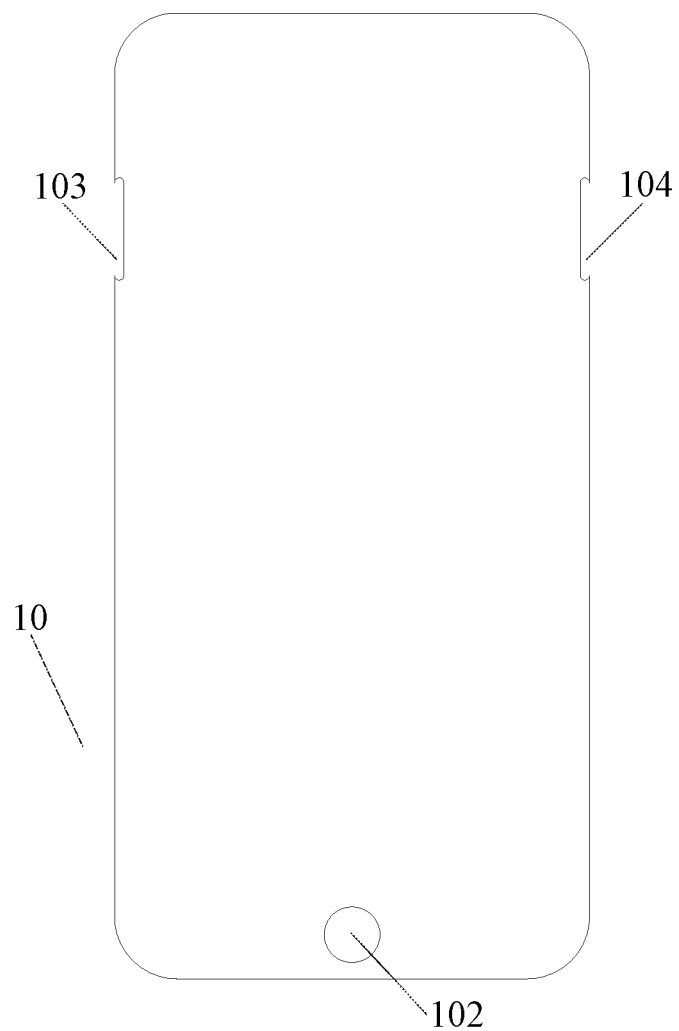
FIG. 12 is a second schematic view of a cover according to some embodiments of the present disclosure.

As shown in FIG. 12, a notch 103 may be defined in the cover 10 at a position corresponding to the notch 205 defined in the display screen 20, and the notch 205 may communicate with the notch 103. A notch 104 may be defined in the cover 10 at a position corresponding to the notch 206 defined in the display screen 20, and the notch 206 may communicate with the notch 104.

In some embodiments, the notch 103 may be disposed correspondingly to the notch 205, such that a through hole defined from an inner side to the outer side (that is to say, the through hole run through the cover 10 and the display screen 20) may be defined at one side of the electronic apparatus 100. The notch 104 disposed correspondingly to the notch 206, such that a through hole defined from the inner side to the outer side (that is to say, the through hole run through the cover 10 and the display screen 20) may be defined at the other side of the electronic apparatus 100. The through hole may facilitate the transmission of the sound signal, such that the sound signal generated by the receiver of the electronic apparatus 100 may be transmitted to the outer side of the electronic apparatus, while the microphone of the electronic apparatus 100 may collect the external sound signal.

Figure 13:
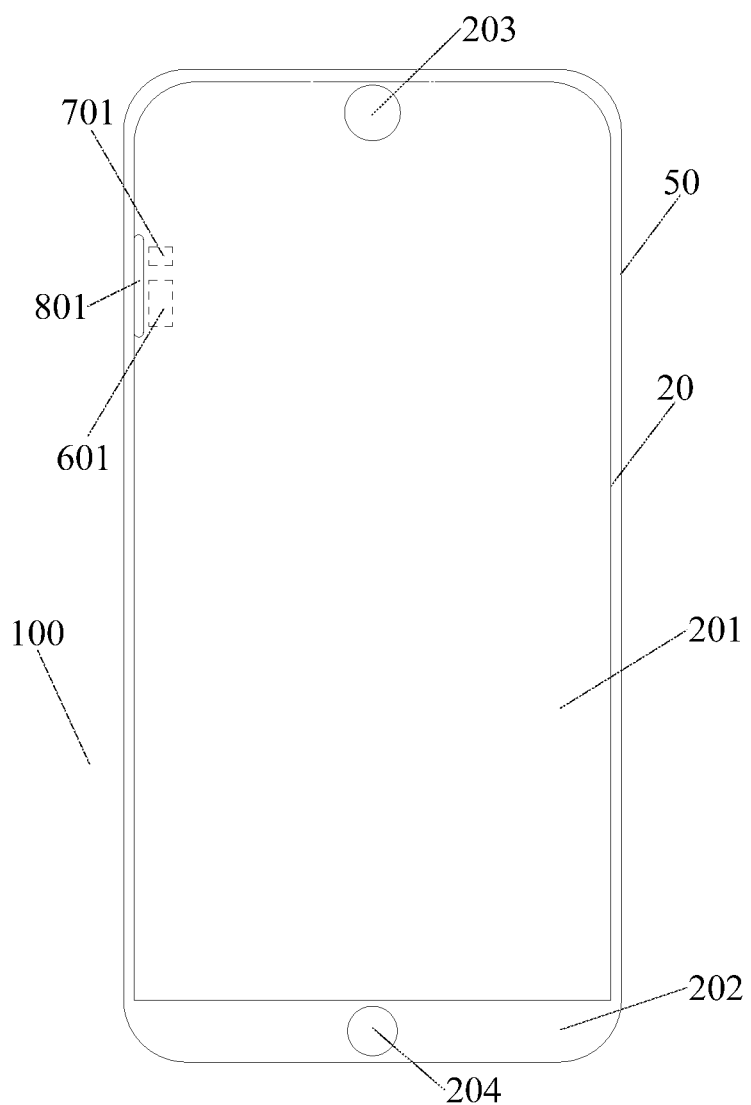
FIG. 13 is a third schematic view of an electronic apparatus according to some embodiments of the present disclosure.

In some embodiments, as shown in FIG. 13, one receiver and one microphone are provided in the electronic apparatus 100. In this case, one slot is defined at the side of the electronic apparatus 100.

In some embodiments, the slot 801 may be defined by one side of the display screen 20 and one inner side of the housing 50. The receiver 601 and the microphone 701 may be both disposed below the display screen 20. The receiver 601 and the microphone 701 may be both disposed close the slot 801. The receiver 601 may be configured to transmit the sound signal to the outer side via the slot 801, and the microphone 701 may be configured to collect the external sound signal via the slot 801.

The electronic apparatus provided by the embodiments of the present disclosure is described in detail. The specific examples are used herein to explain principles and embodiments of the present disclosure. The description of the above embodiments is only for helping to understand the present disclosure. Meanwhile, those skilled in the art may change the specific embodiments and the application according to the idea of the present disclosure. In conclusion, the content of the specification should not be construed as a limitation to the present disclosure.

What is claimed is:

1. An electronic apparatus, comprising:
   a housing;
   a display screen, mounted on the housing and defining a first through hole;
   a camera assembly, disposed correspondingly to the first through hole, wherein a step portion formed by the camera assembly, and the step portion comprises a surface facing towards the display screen; and
   a sensor assembly, comprising a signal transmitter and a signal receiver, wherein the signal transmitter and the signal receiver are mounted on the surface of the step portion formed by the camera assembly.

2. The electronic apparatus of claim 1, wherein the camera assembly comprises a lens, and the signal transmitter and the signal receiver are disposed at two opposite sides of the lens along a width direction or a length direction of the electronic apparatus.

3. The electronic apparatus of claim 1, wherein the sensor assembly comprises an ambient light sensor configured to receive an ambient light signal via the first through hole, and the ambient light sensor is mounted on the camera assembly.

4. The electronic apparatus of claim 1, wherein the camera assembly comprises a base and a lens mounted on the base; a size of a contour of the base is greater than that of the lens; and the lens and the base cooperatively form the step portion.

5. The electronic apparatus of claim 1, further comprising:
a cover, covering the display screen and defining a second through hole at a position corresponding to the first through hole; wherein the first through hole communicates with the second through hole; and
a receiver, mounted inside the housing and adjacent to the camera assembly and configured to transmit a sound signal to an outer side of the electronic apparatus via the first through hole and the second through hole, wherein the receiver is invisible from the first through hole and the second through hole when viewed from the outer side of the electronic apparatus.

6. The electronic apparatus of claim 5, further comprising a microphone, wherein the microphone is mounted inside the housing and adjacent to the camera assembly and configured to collect an external sound signal via the first through hole and the second through hole, wherein the microphone is invisible from the first through hole and the second through hole when viewed from the outer side of the electronic apparatus.

7. The electronic apparatus of claim 1, further comprising a cover and a receiver;
wherein a slot is defined by at least one side of the display screen and the housing;
the cover covers the display screen, and a notch is defined in the cover at a position corresponding to the slot; the notch communicates with the slot; and
the receiver is mounted inside the housing and adjacent to the slot and configured to transmit a sound signal to an outer side of the electronic apparatus via the slot and the notch, wherein the receiver is invisible from the slot and the notch when viewed from the outer side of the electronic apparatus.

8. The electronic apparatus of claim 7, further comprising a microphone, wherein the microphone is mounted inside the housing and adjacent to the slot and configured to collect an external sound signal via the slot and the notch, and the microphone is invisible from the slot and the notch when viewed from the outer side of the electronic apparatus.

9. The electronic apparatus of claim 7, wherein the slot is in shape of an elongated rectangle or a rounded rectangle, and the slot has a width ranged between 0.4 mm and 0.5 mm.

10. The electronic apparatus of claim 1, further comprising a cover and two receivers;
wherein two slots are defined by the two opposite sides of the display screen and corresponding sides of the housing;
the cover covers the display screen, and two notches are defined by two opposite sides of cover at positions corresponding to the slots; and
the receivers are mounted inside the housing, and each of the receivers is configured to transmit a sound signal to an outer side of the electronic apparatus via one of the slots and the corresponding notch, wherein the receivers are invisible from the slots and the notches when viewed from the outer side of the electronic apparatus.

11. An electronic apparatus, comprising:
a housing,
a display screen, mounted on the housing and defining a first through hole;
a camera assembly, disposed correspondingly to the first through hole and comprising:
a base, having a mounting surface facing towards the display screen; and
a lens, disposed on the mounting surface; and
a sensor assembly, comprising a signal transmitter and a signal receiver, wherein the signal transmitter and the signal receiver are disposed on the mounting surface of the camera assembly.

12. The electronic apparatus of claim 11, wherein the lens is located in a middle of the mounting surface; and
the signal transmitter and the signal receiver are disposed at two opposite sides of the lens along a width direction or a length direction of the electronic apparatus.

13. The electronic apparatus of claim 11, wherein the sensor assembly comprises an ambient light sensor disposed on the mounting surface of the camera assembly and configured to receive an ambient light signal via the first through hole; and the ambient light sensor spaces apart from the lens.

14. The electronic apparatus of claim 11, wherein a size of a contour of the base is greater than that of the lens, and the base is in shape of a rectangle or a circle.

15. The electronic apparatus of claim 11, further comprising:
a cover, covering the display screen and defining a second through hole at a position corresponding to the first through hole; wherein the first through hole communicates with the second through hole;
a receiver, mounted inside the housing and adjacent to the camera assembly and configured to transmit a sound signal to an outer side of the electronic apparatus via the first through hole and the second through hole; and
a microphone, mounted inside the housing and adjacent to the camera assembly and configured to collect an external sound signal via the first through hole and the second through hole, wherein the receiver and the microphone are invisible from the first through hole and the second through hole when viewed from the outer side of the electronic apparatus.

16. The electronic apparatus of claim 11, further comprising a cover, a receiver, and a microphone;
wherein a slot is defined by at least one side of the display screen and the housing;
the cover covers the display screen, and a notch is defined in the cover at a position corresponding to the slot; the notch communicates with the slot;
the receiver and the microphone are mounted inside the housing and adjacent to the slot, and the receiver is configured to transmit a sound signal to an outer side of the electronic apparatus via the slot and the notch; and
the microphone is configured to collect an external sound signal via the slot and the notch, wherein the receiver and the microphone are invisible from the slot and the notch when viewed from the outer side of the electronic apparatus.

17. The electronic apparatus of claim 16, wherein the slot is in shape of an elongated rectangle or a rounded rectangle, and the slot has a width ranged between 0.4 mm and 0.5 mm.

18. The electronic apparatus of claim 11, further comprising a cover and two receivers;

wherein two slots are defined by the two opposite sides of the display screen and corresponding sides of the housing;

the cover covers the display screen, and two notches are defined by two opposite sides of cover at positions corresponding to the slots; and the receivers are mounted inside the housing, and each of the receivers is configured to transmit a sound signal to an outer side of the electronic apparatus via one of the slots and the corresponding notch, wherein the receivers are invisible from the slots and the notches when viewed from the outer side of the electronic apparatus.

19. A camera assembly for an electronic apparatus, the electronic apparatus comprising a display screen and a sensor assembly, the camera assembly comprising:

a base, having a mounting surface facing towards the display screen and configured to arrange the sensor assembly thereon; and a lens, disposed on the mounting surface of the base and spacing apart from the sensor assembly;

wherein the sensor assembly comprises a signal transmitter and a signal receiver, and the signal transmitter and the signal receiver are mounted on the mounting surface of the camera assembly.

20. The camera assembly of claim 19, wherein the lens is located in a middle of the mounting surface, and the sensor assembly comprises at least one of a proximity sensor and an ambient light sensor spacing apart from each other; and the proximity sensor comprises the signal transmitter and the signal receiver mounted on the camera assembly and disposed at two opposite sides of the lens along a width direction or a length direction of the electronic apparatus.

* * * * *